US009351139B2

(12) United States Patent
Jang et al.

(10) Patent No.: US 9,351,139 B2
(45) Date of Patent: *May 24, 2016

(54) LOCATION INFORMATION FOR A MOBILE STATION

(75) Inventors: Ke-Chi Jang, Plano, TX (US); Robert E. Denman, Plano, TX (US); Chung-Ching Wang, Plano, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/732,395

(22) Filed: Mar. 26, 2010

(65) Prior Publication Data
US 2010/0178935 A1    Jul. 15, 2010

Related U.S. Application Data

(63) Continuation of application No. 10/800,055, filed on Mar. 12, 2004, now Pat. No. 7,738,855.

(60) Provisional application No. 60/454,827, filed on Mar. 14, 2003.

(51) Int. Cl.
| H04M 11/04 | (2006.01) |
| H04W 4/22 | (2009.01) |
| H04W 76/00 | (2009.01) |

(52) U.S. Cl.
CPC .............. *H04W 4/22* (2013.01); *H04W 76/007* (2013.01)

(58) Field of Classification Search
USPC ..................................................... 455/404.1
See application file for complete search history.

(56) References Cited

U.S. PATENT DOCUMENTS

| 5,613,205 | A * | 3/1997 | Dufour ......................... 455/440 |
| 6,195,557 | B1 | 2/2001 | Havinis et al. |
| 6,311,069 | B1 | 10/2001 | Havinis et al. |
| 6,442,391 | B1 | 8/2002 | Johansson et al. |
| 7,395,046 | B2 | 7/2008 | Hossain et al. |
| 2001/0009544 | A1* | 7/2001 | Vanttinen et al. .............. 370/338 |
| 2002/0072376 | A1* | 6/2002 | Carlsson et al. .............. 455/456 |
| 2004/0176104 | A1* | 9/2004 | Arcens ....................... 455/456.3 |
| 2004/0180655 | A1 | 9/2004 | Jang |

(Continued)

OTHER PUBLICATIONS

"Final Office Action", U.S. Appl. No. 10/800,055, (May 22, 2006), 21 pages.

(Continued)

*Primary Examiner* — German J Viana Di Prisco
(74) *Attorney, Agent, or Firm* — Dan Choi; Judy Yee; Micky Minhas (57) ABSTRACT

In a wireless communications network, a method of performing a location service with respect to a mobile station includes communicating a paging message containing an indication of whether the paging message is related to at least one of an emergency-related location service and a law enforcement-related location service. In another aspect, a mobile station in a wireless communications network communicates messaging to move the mobile station to a traffic channel in response to a callback by at least one of an emergency services entity and a law enforcement entity. The mobile station also receives a location request on the traffic channel, the location request containing an indication of whether the location request is related to at least one of an emergency-related location service and a law enforcement-related location service.

23 Claims, 3 Drawing Sheets

(56) References Cited

U.S. PATENT DOCUMENTS

2004/0242191 A1* 12/2004 Hossain et al. ............ 455/404.1
2008/0032714 A1 2/2008 Suzuki et al.

OTHER PUBLICATIONS

"Non-Final Office Action", U.S. Appl. No. 10/800,055, (Jan. 6, 2009), 23 pages.
"Non-Final Office Action", U.S. Appl. No. 10/800,055, (Jun. 9, 2008), 41 pages.
"Non-Final Office Action", U.S. Appl. No. 10/800,055, (Jun. 19, 2007), 20 pages.
"Non-Final Office Action", U.S. Appl. No. 10/800,055, (Jul. 6, 2009), 6 pages.
"Non-Final Office Action", U.S. Appl. No. 10/800,055, (Aug. 25, 2006), 18 pages.
"Non-Final Office Action", U.S. Appl. No. 10/800,055, (Nov. 2, 2005), 17 pages.
"Non-Final Office Action", U.S. Appl. No. 10/800,055, (Nov. 28, 2007), 29 pages.
"Notice of Allowance", U.S. Appl. No. 10/800,055, (Feb. 5, 2010), 7 page.
"Position Determination Service Standards for Dual Mode Spread Spectrum Systems", *Telecommunications Industry Association, TIA/EIA Interim Standard, Addendum 1, TIA/EIA/IS-801-1*, (Mar. 2001), 148 pages.
Gaal, Peter et al., "Improved Reject Message", *3rd Generation Partnership Project 2, 3GPP2* (Feb. 17, 2003), 6 pages.
Rousseau, Jean-Michel "IS-801 Emergency Indicator", *3rd Generation Partnership Project 2*, (Feb. 18, 2003), 4 pages.

* cited by examiner

LOCATION INFORMATION FOR A MOBILE STATION

CROSS REFERENCE TO RELATED APPLICATION

This is a continuation of and claims priority to U.S. Ser. No. 10/800,055, filed Mar. 12, 2004, now U.S. Pat. No. 7,738,855, which in turn claims priority to U.S. Provisional Application No. 60/454,827, filed Mar. 14, 2003, the entire disclosures of which are hereby incorporated by reference in their entirety herein.

TECHNICAL FIELD

The invention is generally related to providing location-based services in a wireless communications network.

BACKGROUND

A mobile communications network is typically made up of a plurality of cells. Each cell is provided by a radio base station, with each base station connected to a mobile switching center or a packet service node that manages communications sessions between mobile stations and terminals coupled to a public switched telephone network (PSTN) or a packet-based data network. Communications between mobile stations and base stations are performed over wireless links.

A service that can be provided by a wireless communications network is a location service (for determining a position of a mobile station). There are two general categories of location services: emergency (E911) services (ES); and value added services (VAS) or commercial services, such as navigational services (e.g., services to find a store or other location), locate-me type services, and so forth.

A wireless communications network that is capable of providing location services typically includes base stations, a mobile switching center (MSC), a mobile position center (MPC), and one or more position determining entities (PDEs). The MPC receives location requests from either an ES network or a VAS-related entity. The MPC selects a PDE to interact with the mobile station and the MSC in the determination of the location of the mobile station.

Standards that define protocol messaging for location services in a wireless communications network include the TIA/EIA/IS-801, TIA/EIA/IS-881, and J-STD-036-A standards. Messaging exchanged between the MPC, PDE, MSC, and mobile station for VAS-related location services is defined by TIA/EIA/IS-881, while messaging for ES-related location services is defined by J-STD-036-A. Per both standards, the MSC may receive the InterSystemPositionRequest INVOICE (ISPOSREQ) message from the serving MPC. The ISPOSREQ message may contain a field, referred to as the LCS (location services) Client Type (CTYP) field, to indicate whether or not the entity requesting location services is requesting emergency services. The absence of the CTYP field indicates that the requesting entity is ES-related.

The TIA/EIA/IS-801 standard defines protocol messaging conveyed between the mobile station and the PDE that includes positioning determination data messages (PDDMs), where each PDDM contains one or more request and/or response elements. PDDMs are conveyed over a traffic channel for both ES and VAS-related location services.

In certain scenarios, an ES-related entity, such as a public safety answering point (PSAP) within an ES network, may attempt to contact the mobile station user after an emergency services call has ended due to either a call drop (due to signal attenuation or other reason) or when the PSAP may want to call back the mobile station user to obtain more information or to obtain an updated position of a moving mobile station. Should the callback be initiated by the PSAP for the purpose of location services, the PDE, MSC, base station, and mobile station may in some scenarios treat the location request as if the location request were related to a value-added service, since these network elements typically cannot distinguish a network-initiated location request related to ES callback from a network-initiated, value-added service location request. The mobile station is also unable to determine whether a location request is VAS- or ES-related by examining the content of a PDDM. Thus, if a mobile station is configured by a user such that a mobile station disables all location services except for ES-related services, the mobile station may reject ES-related request elements received in a PDDM over a traffic channel if the mobile station incorrectly assumes that the PDDM is from a VAS-related entity. The inability to obtain the mobile station's precise position may result in safety concerns.

In some cases, an ES-related entity may wish to perform an idle-mode location query in which the ES-related entity attempts to obtain the location of a mobile station that is idle without having to establish a voice call. To do so, a page with a particular service option (such as service option 35 or 36) for location services is sent to the mobile station. However, the mobile station has no way of knowing whether or not the page is related to an ES location service. If the mobile station is configured to accept ES-related location requests only, the mobile station may incorrectly assume that the page is VAS-related and thus reject the page's service option.

In other scenarios, a mobile station configured to accept only ES-related location services may erroneously accept VAS-related location requests if the mobile station incorrectly determines that the VAS-related location request is ES-related. In either case, the inability to accurately distinguish between ES-related and VAS-related location requests results in erroneous processing of such location requests in a wireless communications network.

SUMMARY

In general, according to one embodiment, a method of performing a location service with respect to a mobile station includes communicating a paging message in a mobile communications network, the paging message containing an indication of whether the paging message is related to at least one of an emergency-related location service and a law enforcement-related location service.

According to another embodiment, a mobile station in a wireless communications network communicates messaging to move a mobile station to a traffic channel in response to a callback by at least one of an emergency service entity and a law enforcement entity. The mobile station also receives a location request on the traffic channel containing an indication of whether the location request is related to at least one of an emergency-related location service and a law enforcement-related location service.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
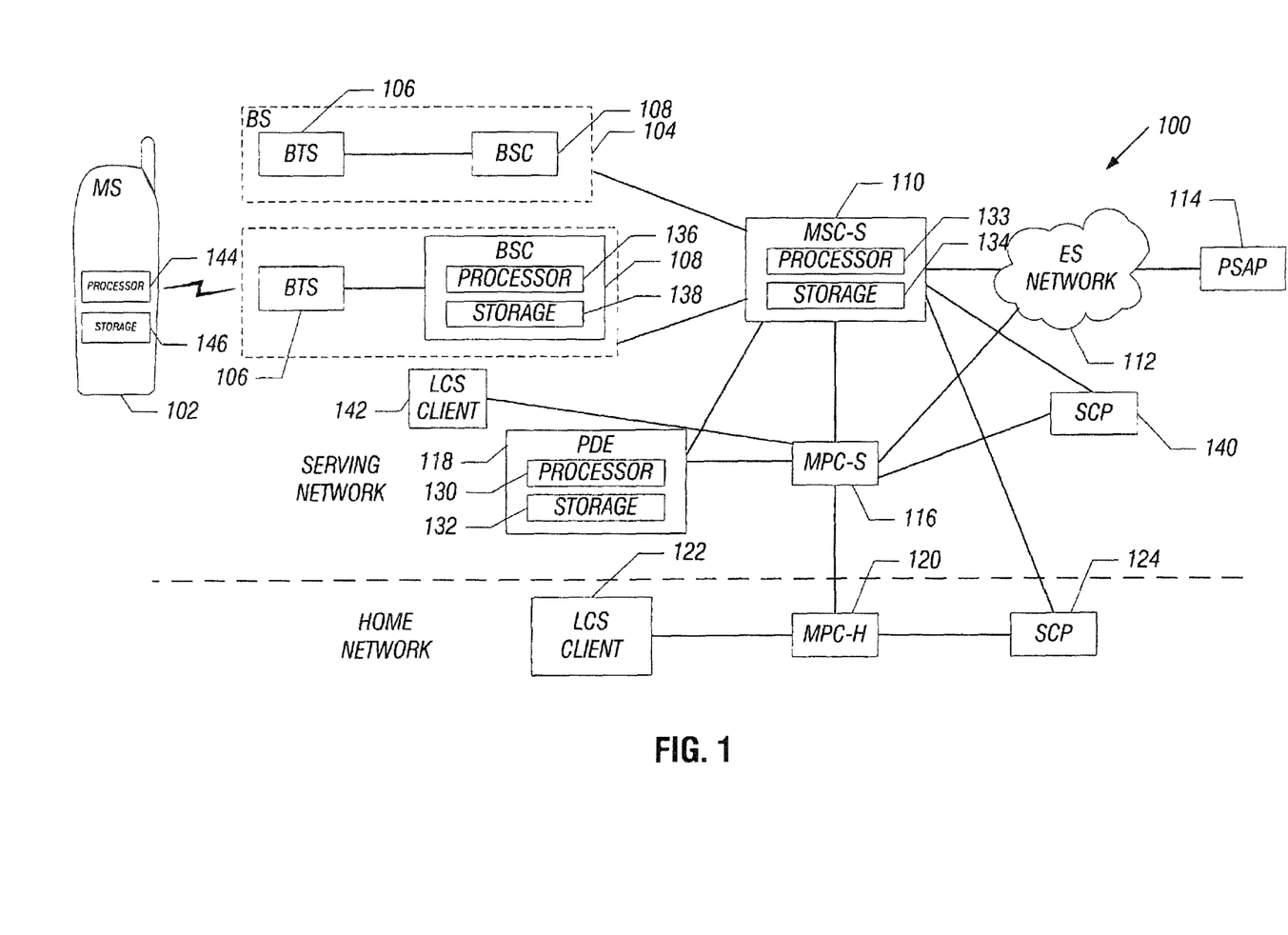
FIG. 1 is a block diagram of a wireless communications network that provides location services in accordance to some embodiments of the invention.

FIG. 1 illustrates a mobile or wireless communications network 100, which includes a serving network and a home network of a mobile station 102. Examples of the mobile station 102 include mobile phones, portable computers with wireless modems, wireless-enabled personal digital assistants (PDAs), a global positioning system (GPS) device, and so forth. When the mobile station 102 moves out its home network into a visited network, the visited network is the serving network for the mobile station 102. Note, however, that the concept of serving network and home network is provided for the purpose of example, as the description of some embodiments of the invention is equally applicable to a mobile station 102 that remains in its home network. In other words, for purpose of some embodiments of the invention, it is irrelevant whether the mobile station 102 resides in a visited network or in its home network.

The mobile station 102 communicates with a base station 104 that serves a cell (or cell sector) in which the mobile station 102 is located. The base station 104 includes two entities, a base transceiver system (BTS) 106 and a base station controller 108. The BTS 106 communicates radio frequency (RF) signals with the mobile station 102, and the BSC 108 communicates with a mobile switching center (MSC) 110.

The MSC 110 is labeled MSC-S to indicate that it is a serving MSC (for serving the mobile station 102). The serving network also includes additional cells or cell sectors associated with other respective base stations 104. In some embodiments, more than one BTS 106 can be connected to one BSC 108.

In one example, the wireless communications network is a code-division multiple access (CDMA) network that provides circuit-switched and packet-switched services. In one implementation, the air interface between a mobile station and a BTS is defined by TIA/EIA/IS-95 and TIA/EIA/IS-2000, while messaging between the MSC and a base station is defined by TIA/EIA/IS-2001. In other implementations, other types of wireless communications networks can incorporate some embodiments of the invention. Examples of other wireless communications networks include GSM (Global System for Mobile) networks, UMTS (Universal Mobile Telecommunications System) networks, wireless LANs, and other networks.

For providing location services, the serving network includes a mobile position center (MPC) 116, labeled MPC-S (serving MPC) to indicate that it is part of the serving network. The serving network also includes a position determining entity (PDE) 118. Note that more than one PDE may be located in the serving network. The PDE 118 helps to determine the position or location of a mobile station in response to a request for location service. A service control point (SCP) 124 is connected to the serving MPC 116 and serving MSC 110. The serving MPC 116 receives location or position requests from a requesting entity, such as from an entity in an emergency services (ES) network 112. Such an entity is a public safety answering point (PSAP) 114, which is an entity in the ES network 112 where emergency calls are received and routed for processing of an emergency service. In providing emergency services, the PSAP 114 requests, via the ES network 112, the location of a mobile station that originated the emergency call. Another type of requesting entity is a value-added service (VAS-related) entity, such as location service (LCS) client 142, that obtains the position of the mobile station 102 to provide navigational services, locateme type services, and so forth. In the ensuing discussion, the terms "location request" and "position request" are used interchangeably to refer to a request for determining the geographic position or location of a mobile station.

FIG. 1 also shows a home MPC (MPC-H) 120 in the home network. For a mobile station that has not roamed outside its home network, the same network element may function as both MPC-H and MPC-S. The home MPC 120 is also connected to an SCP 124, which is also connected to the serving MSC 110. Also, depicted in FIG. 1 is an LCS client 122 connected to the home MPC 120.

When the mobile station 102 registers with the wireless communications network 100, or when the mobile station 102 originates a call, the mobile station 102 may advise the wireless communications network 100 of its location services capabilities in a registration message or an origination message. According to IS-2000, location service capabilities can be included in a GEO_LOC_TYPE information element in the IS-2000 Registration Message or Origination Message. If the location services capabilities indicate support for TIA/EIA/IS-801, a PDE (such as PDE 118) in the wireless communications network is able to establish a session with the mobile station 102 for the exchange of application-layer protocol messaging defined by TIA/EIA/IS-801. The protocol messaging conveyed between the mobile station 102 and the PDE 118 includes position determination data messages (PDDMs), where each PDDM contains one or more request and/or response elements. In the TIA/EIA/IS-801 exchange, the MSC 110 and base station 104 provide transparent transport of the application-layer protocol messaging (PDDMs). In other implementations, other types of messaging may be provided to carry location service-related information between the mobile station and another entity in the wireless communications network 100.

In accordance with some embodiments of the invention, special indicators are provided in messages communicated in the wireless communications network 100 to indicate whether a location request for the mobile station 102 is ES-related or VAS-related. This indicator can be used by the mobile station 102 to reliably determine that an incoming call or request is ES-related or VAS-related. In some cases, a user of the mobile station 102 may disable all location requests except for ES-related location requests. In such a scenario, if the mobile station 102 is unable to reliably determine whether an incoming location request is related to emergency services or value-added services, the mobile station 102 may reject an incoming ES-related location request or erroneously accept VAS-related location requests based on an incorrect determination that the VAS-related location requests are ES-related.

The special indicator is in the form of an emergency services field that is set to a first state to indicate that a location request is ES-related, and to a second state to indicate that a location request is VAS-related. The special indicator is included in paging messages and/or in positioning messages (e.g., PDDMs) exchanged over a traffic channel.

A paging message that contains the special indicator refers to either a paging request from the mobile switching center 110 to a base station 104, or a page from a base station 104 to the mobile station 102. For example, an MSC-to-BS paging request that can include an emergency services information element can be an IS-2001 paging request. An example of a page from the base station 104 to the mobile station 102 that can contain an emergency services field includes an IS-2000 general page message (GPM) or a universal page message (UPM) that is sent by the base station 104 to enable the network to initiate a call with the mobile station. The emergency services field included in the GPM or UPM may be referred to as an EMERGENCY_SERVICES field, which is set to logical "1" to indicate emergency services, and to logical "0" to indicate non-emergency services (such as VAS-related services).

An indicator of whether a location request is ES-related or VAS-related can also be included in position messages (e.g., PDDMs) exchanged between a PDE and the mobile station. Thus, the EMERGENCY_SERVICES field can also be added to the header of each PDDM that is communicated from a PDE 118 to the mobile station 102 to indicate to the mobile station whether a received PDDM is ES-related or VAS-related.

There are several scenarios in which the mobile station 102 may deny an ES-related location request, or erroneously accept a VAS-related location request if the emergency services field discussed above is not used. In a first scenario (referred to as "Scenario 1"), for the mobile station 102 that has been configured by its user to support only ES-related location services, active-mode location queries during emergency callback will fail, if the emergency services field according to some embodiments is not used. Two types of position queries can be issued: idle-mode position queries and active-mode position queries. Idle-mode position queries are for location services for which the mobile station is moved to a traffic channel for the purpose of exchanging PDDMs. Active-mode position queries are for location services for which the mobile station is already on a traffic channel for some other service, such that the traffic channel can be additionally used for the purpose of exchanging PDDMs.

In Scenario 1, the mobile station 102 originates an ES call (such as to the PSAP 114), but the call drops before the ES network 112 is able to obtain the location of the mobile station. The call may drop due to poor or weak RF signaling between the mobile station and a base station. If such call drop occurs, the PSAP 114 may use a callback number provided to the PSAP 14 during the initial call by the mobile station 102 to call back the mobile station 102. Callback by the PSAP 114 causes the mobile station to be moved to a traffic channel so that the traffic channel can be used for the exchange of PDDMs. The PSAP 114 then sends a location request to the serving network to obtain the location of the mobile station. In response, the PDE 118 in the serving network initiates a session with the mobile station (102) to obtain location information of the mobile station. According to one implementation, the PDE 118 can establish an TIA/EIA/IS-801 session with the mobile station 102, where TIA/EIA/IS-801 defines messaging exchanged over traffic channels for purposes of acquiring location information and other related information. However, without the indicator provided by some embodiments of the invention, the mobile station is unable to determine whether the incoming location request from the PDE 118 is ES-related or VAS-related. The mobile station 102 may assume that the incoming location request is VAS-related, and thus, the location request may be rejected by the mobile station 102. As a result, the PSAP 114 will not be able to obtain the precise position of the mobile station 102.

In a second scenario ("Scenario 2"), for the mobile station 102 that has been configured by its user to support only ES-related location services, an idle-mode location query initiated by the ES network 112 will fail, if the emergency services field according to some embodiments is not employed. In this case, the mobile station 102 is idle, such that a location request constitutes an idle-mode location query. The mobile station is idle when it is currently not communicating over a traffic channel in the wireless communications network. In Scenario 2, the mobile station 102 originates an emergency services call, but the call is subsequently released by either the PSAP 114 or the mobile station 102. The PSAP 114 may wish to obtain the updated position of the mobile station 102 (which may be moving) without having to again establish a voice call. The serving MSC 110, upon receiving a location request from the serving MPC 116, attempts an idle-mode location query, which results in the base station 104 sending a page (that specifies service option 35 or 36) to the mobile station 102. A page specifying service option (SO) 35 or 36 is a page seeking a location service, not a voice call. Since the mobile station is configured to support location service for emergency services only, and since emergency services calls are originated by the mobile station, the mobile station 102 will reject this call. The PSAP 114 will thus be unable to obtain the updated, precise position of the mobile station 102.

In a third scenario ("Scenario 3"), the mobile station 102 that has been configured to support only ES-related location services may reject request elements in TIA/EIA/IS-801 PDDMs that are ES-related, if the emergency services field according to some embodiments is not used. In this scenario, the mobile station 102 is in a voice call, but then the mobile station 102 sends a flash with information message (FWIM) to successfully place an emergency services call. For some reason, such as delays due to congestion at the serving MPC 116 or at the selected PDE 118, the PSAP 114 or the mobile station 102 releases the emergency services call before PDDMs are exchanged. At this time, the mobile station 102 resumes the prior voice call. At some later point, the PDE 118 may finally send the ES-related PDDMs to the mobile station; however, since the mobile station 102 detects that the mobile station is not currently in an emergency services call, the mobile station 102 assumes that the PDDMs are VAS-related. As a result, the mobile station 102 rejects request elements contained in the PDDMs, which prevents the PSAP 114 from obtaining the precise position of the mobile station.

In a fourth scenario ("Scenario 4"), a mobile station that has been configured to support only ES-related location services may incorrectly accept PDDMs that are VAS-related, if the emergency services field according to some embodiments is not used. In one example, the mobile station 102 has just been configured to support only ES-related location services, and the mobile station 102 is in a voice call. Not knowing that the user has temporarily disabled VAS-related location services, the provider of location services to which the user subscribes attempts to initiate a VAS-related session with the mobile station 102. Since the mobile station 102 is currently in a voice call, the query from the provider is an active-mode location query. The PDE 118 is selected for the VAS-related session, which sends a PDDM to the mobile station containing request elements. In the meantime, the mobile station 102 has sent a flash with information message (FWIM) to initiate an emergency services call. Before a request is received from the emergency services network 112 by the serving MPC 116, the mobile station 102 receives the VAS-related PDDM.

Since the mobile station is in an emergency services call, the mobile station 102 assumes that the VAS-related PDDM is ES-related, and responds to the PDE 118 with a PDDM containing location-related information, in violation of the configuration by the user in which the mobile station is to only respond to ES-related location requests. Effectively, in this case, a race condition exists between PDDMs resulting from an ES-related location request and PDDMs resulting from a VAS-related location request.

In a fifth scenario ("Scenario 5"), which is a continuation of Scenario 4 discussed above, the mobile station 102 that is currently in a VAS-related call session may be unable to preempt the VAS-related session in order to accept an ES-related PDDM. Thus, if the mobile station 102 receives an ES-related PDDM during a VAS-related session, the mobile station 102 will reject the request elements in the ES-related PDDM. As the mobile station cannot distinguish between an ES-related PDDM from a VAS-related PDDM, the mobile station 102 will be unable to preempt the VAS-related session in order to expedite the ES-related session.

To address these issues, emergency services fields are inserted into paging messages (MSC paging requests, base station pages) and/or positioning messages (e.g., PDDMs) for indicating whether or not a location request is ES-related, as discussed above. For Scenario 2 above, adding the EMERGENCY_SERVICES field in the GPM or UPM (or other page from a base station to a mobile station) enables the mobile station configured for ES-related location services but not VAS-related location services to detect that the page is ES-related. As a result, the mobile station allows connection of SO 35 or SO 36 for the exchange of ES-related PDDMs over a traffic channel. To address Scenarios 1, 3, 4, and 5, adding the EMERGENCY_SERVICES field to the header of a PDDM enables the mobile station to discern whether or not a received PDDM is ES-related. Also, in Scenario 5, the EMERGENCY_SERVICES field enables the mobile station to preempt an existing VAS-related session in favor of an ES-related session.

Due to explicit specification of whether a location request is ES-related or VAS-related, the mobile station does not have to rely on possibly spurious context information to determine whether or not a PDDM is ES-related. Using context information above, the mobile station may, under various circumstances, including but not limited to those noted for Scenarios 1-5, incorrectly infer an association between a location request and either a value-added service or emergency service.

Although discussed in the context of emergency-related location services, similar techniques can be applied for other applications, such as for purposes of surveillance by law enforcement entities. In these other implementations, a SURVEILLANCE_SERVICES field can be added to the PDDM, GPM, or UPM, to enable the mobile station 102 to determine whether a location request is associated with surveillance by law enforcement (referred to here as "law enforcement-related location service"). A more general field, such a REGULATORY_SERVICES field, can be added to the PDDM, GPM, or UPM to indicate either an ES-related location service or a law enforcement-related location service is requested.

Figure 2:
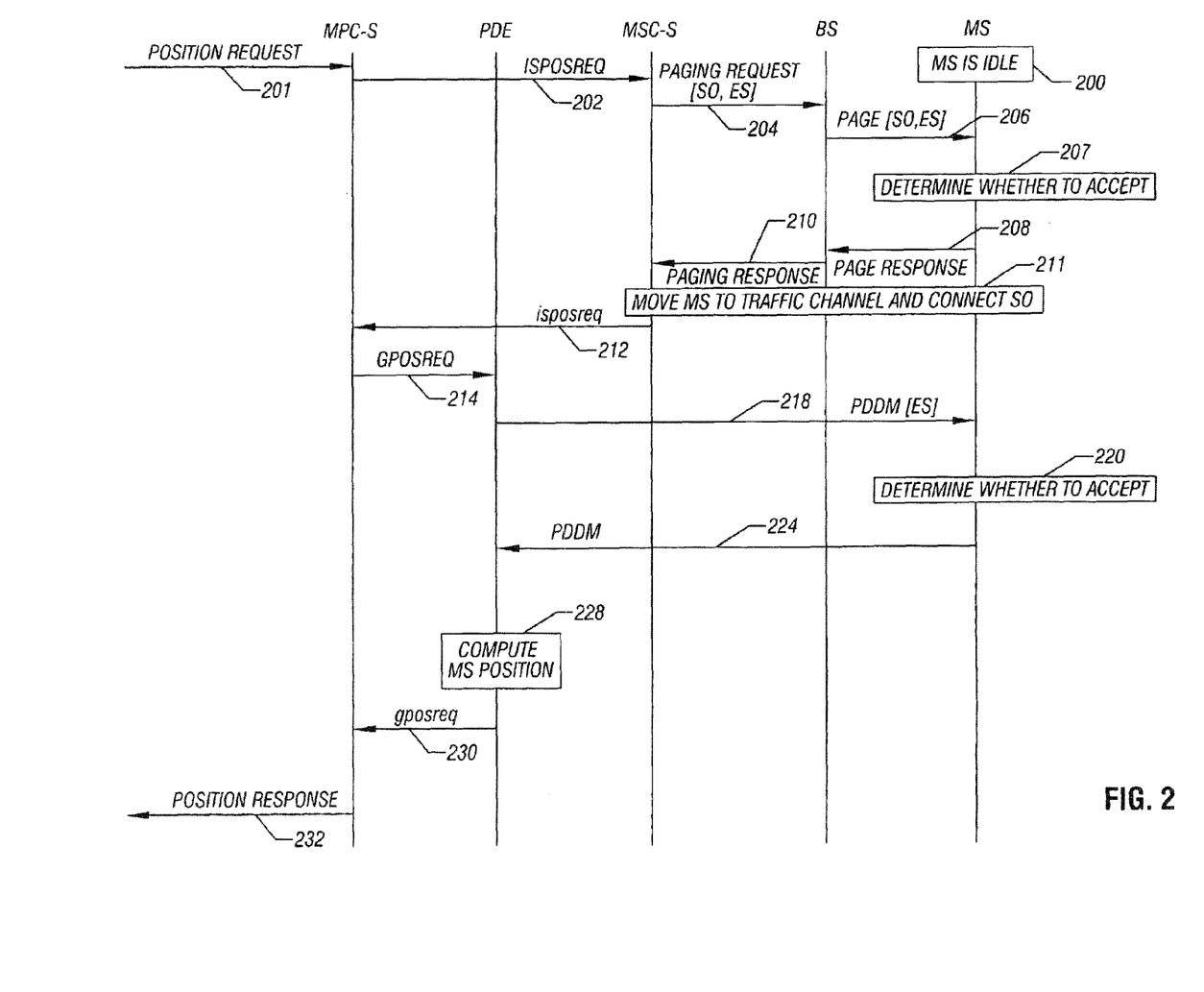
FIG. 2 is a message flow diagram of a network-initiated location service involving an idle mobile station, according to an embodiment.

FIG. 2 is a message flow diagram that illustrates an idle-mode location query to the mobile station, which is in an idle state (200). The mobile station 102 is in the idle state when it is currently not in another call session. For purposes of the present discussion, it is assumed that the mobile station has already registered with the wireless communications network, and has indicated the mobile station's ability to support location services, including support for TIA/EIA/IS-801 protocol messaging according to one implementation. The serving MPC (MPC-S) 116 receives (at 201) an ES-related position request from the ES network 112. According to one implementation, the ES-related position request is an EmergencyServicesPositionRequest INVOKE (ESPOSREQ) message (as defined by J-STD-036-A). A position request from a VAS-related entity, on the other hand, is an InterSystemPositionRequest INVOKE (ISPOSREQ) message (as defined by TIA/EIA/IS-881).

In response to the position request (received at 201), the serving MPC 116 sends (at 202) a position request (which in one implementation is in the form of an ISPOSREQ message to the serving MSC 110). Effectively, the ISPOSREQ message sent from the serving MPC 116 to the serving MSC 110 directs the serving MSC to move the mobile station to a traffic channel for subsequent location services messaging (e.g., TIA/EIA/IS-801 messaging). The ISPOSREQ message also enable the serving MPC 116 to obtain radio environment information for the mobile station, prior to selecting a PDE to interact with the mobile station and the serving MSC in determining the position of the mobile station.

The serving MSC 110, in response to the ISPOSREQ message from the serving MPC 116, sends a paging request (at 204) to the base station 104. The paging request includes an emergency services information element for indicating whether the paging request is related to emergency services. The ISPOSREQ message includes a PositionRequestType parameter that includes a LCS Client Type (CTYP) field. The CTYP field specifies whether or not the requesting entity is related to emergency services. The emergency services information element included in the paging request from the serving MSC 110 to the base station 104 is set to a value that corresponds to the value of CTYP in the ISPOSREQ message. Alternatively, the absence of the CTYP field can be an indication to the serving MSC 110 that the location request is related to emergency services. The emergency services information element in the paging request allows the base station 104 to determine whether the incoming paging request is related to emergency services.

According to one implementation, the paging request sent at 204 specifies either service option 35 (SO 35) or service option 36 (SO 36). SO 35 and SO 36 are the service options used for location services, according to TIA/EIA/TSB58-F.

In response to the paging request from the serving MSC 110, the base station 104 sends a page (at 206) to the mobile station 102. The page can either be a universal page message (UPM) or a general page message (GPM). The page sent at 206 specifies either SO 35 or SO 36, based on the specification of the paging request from the serving MSC 110. The page (UPM or GPM) also includes an EMERGENCY_SERVICES field to indicate to the mobile station whether or not the page is related to emergency services. The value of the EMERGENCY_SERVICES field is based on the emergency services information element in the paging request from the serving MSC 110.

In response, the mobile station 102 determines (at 207) whether it should accept the page. If the mobile station 102 is configured to accept ES-related location requests but not to accept VAS-related location requests, the mobile station 102 will accept the page if the EMERGENCY_SERVICES field in the page indicates emergency services. To accept the service option of the page, the mobile station 102 sends (at 208) a page response to confirm support for the specified service option (SO 35 or 36). To reject the page's service option according to one example implementation, the page response sent by the mobile station specifies SO 0 (service option 0). In response to the page response sent at 208, the base station 104 sends a paging response (at 210) back to the serving MSC 110. The paging response (210) contains radio environment information provided by the base station. After receiving the paging response indicating acceptance of the requested service option, the serving MSC 110, in collaboration with the base station 104 and mobile station 102, moves (at 211) the mobile station to a traffic channel against the requested service option (SO 35 or SO 36). Also, the serving MSC 110 sends (at 212) an isposreq message back to the serving MPC 116, which includes the radio environment information.

Once the radio environment information has been received by the serving MPC 116, the serving MPC 116 selects a PDE (such as the PDE 118) for interacting with the serving MSC 110 and the mobile station 102. The serving MPC 116 then sends (at 214) a GeoPositionRequest INVOKE (GPOSREQ) message to the PDE 118. The GPOSREQ message also contains a PositionRequestType parameter that includes the CTYP field to indicate whether a location services client is related to emergency services.

The PDE 118 then exchanges position determination data messages (PDDMs) with the mobile station 102 (at 218 and 224). The PDDMs are conveyed over a traffic channel assigned to the mobile station 102. The PDDMs sent to the mobile station 102 contains request elements for requesting location-related information. As noted above, each PDDM sent from the base station 104 to the mobile station 102 also contains the EMERGENCY_SERVICES field for indicating whether the PDDM is related to ES-services. The state of the EMERGENCY_SERVICES field is based on the value of the CTYP field contained in the GPOSREQ message sent by the serving MPC 116 to the PDE 118.

At this point, the mobile station 102 determines (at 220) whether or not it is to accept the PDDM. If the mobile station is configured to accept only ES-related location services, then it will accept the PDDM request from the PDE 118 if the EMERGENCY_SERVICES field has a state to indicate emergency services. If the location request in the PDDM is accepted by the mobile station, the mobile station acquires GPS (Global Positioning System) satellite information with assistance of data received from the PDE 118. The GPS information is communicated by the mobile station 102 back to the base station 104 in one or more PDDMs (sent at 224). Alternatively, the mobile station 102 measures the time of arrival of radio signals from multiple base stations and passes the measurements to the PDE 118. Such information is passed in one or more PDDMs (sent at 224). From information provided by the mobile station 102, the PDE 118 computes (at 228) the position of the mobile station 102. The position is calculated in terms of latitude and longitude, according to one implementation. Alternatively, the mobile station 102 itself computes its position, and passes the position in a PDDM (at 224) to the PDE 118. The computed position information is communicated to the serving MPC 116 in a gposreq message (sent at 230). The position data is then sent (at 232) to the location service client (in this case the ES network 112).

Figure 3:
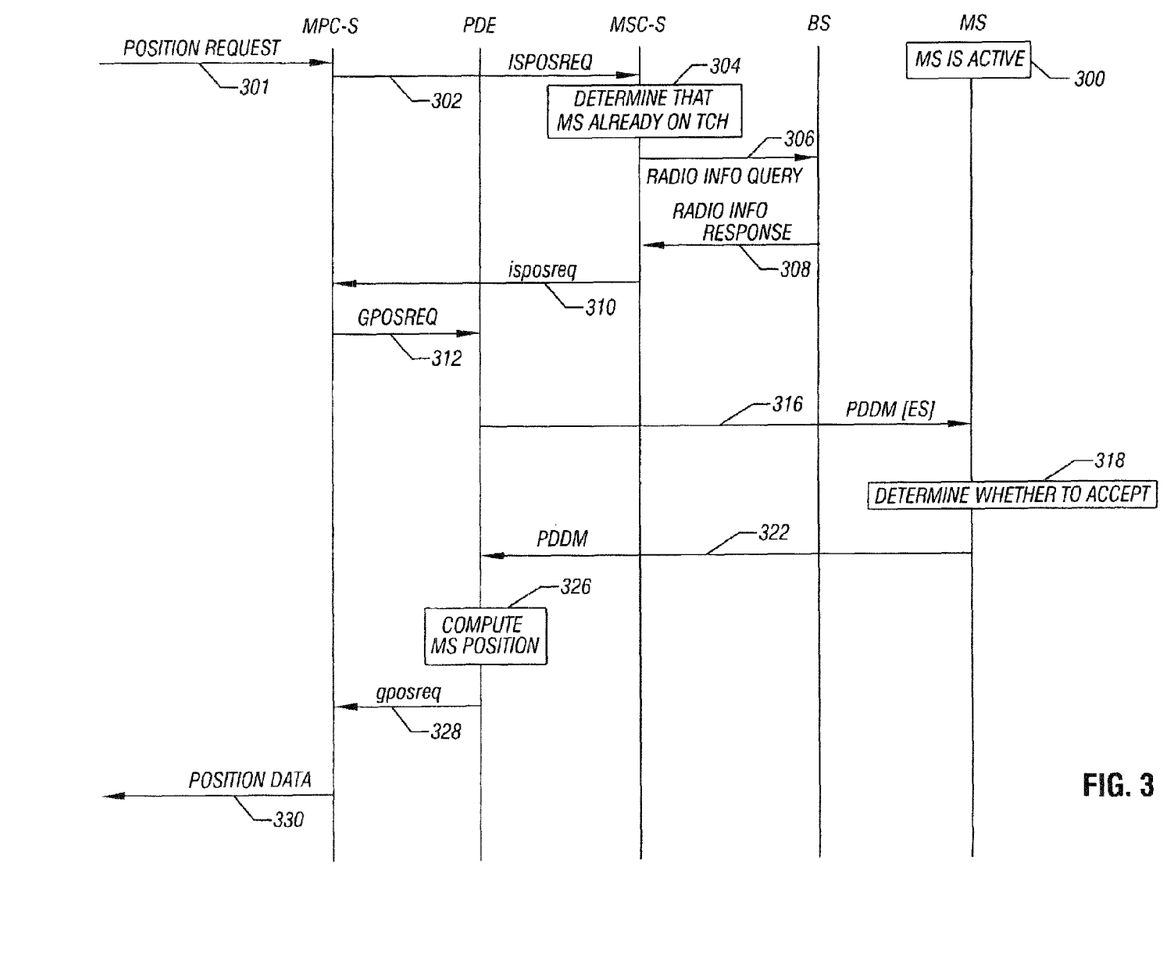
FIG. 3 is a message flow diagram of a network-initiated location service involving an active mobile station, according to an embodiment.

FIG. 3 is a message flow diagram in which a position request is received while the mobile station is actively in a voice call (300). Such a position request is referred to as an active-mode position query. The serving MPC 116 receives (at 301) a position request from the ES network 212 (in the form of an ESPOSREQ message, according to one implementation). In response, the serving MPC 116 sends (at 302) an ISPOSREQ message to the serving MSC 110. The serving MSC 110, in response to the ISPOSREQ message, determines (at 304) that the mobile station 102 is already on a traffic channel. The serving MSC 110 (rather than sending a paging request) sends (at 306) a query to the base station 104 for radio environment information associated with the call session that the mobile station 102 is currently involved in. In response, the base station 104 sends (at 308) the radio environment information to the serving MSC 110, which provides the information to the serving MPC 116 in an isposreq message (at 310). In one implementation specified by TIA/EIA/IS-2001, the query for radio environment information is called a Radio Measurements for Position Request, and the response is called a Radio Measurements for Position Response.

Once the serving MPC 116 has received the radio environment information from the serving MSC 110, the serving MSC 116 sends (at 312) a GPOSREQ message to the PDE 118 (that has been selected to interact with the serving MSC 110 and the mobile station 102 for the requested location service). In response, the PDE 118 exchanges (at 316 and 322) PDDMs with the mobile station on the established traffic channel. The primary traffic (the traffic associated with the call session that the mobile station was already on) and the location services information traffic are multiplexed on the same traffic channel. The PDDM sent by the PDE 118 to the mobile station 102 contains an EMERGENCY_SERVICES field to indicate to the mobile station 102 whether the location service is ES-related. The state of the EMERGENCY_SERVICES field is based on the state of CTYP in the GPOSREQ message. Based on the EMERGENCY_SERVICES field in a PDDM received from the base station 104, the mobile station 102, if it is configured to support ES-related location services but not VAS-related location services, determines (at 318) whether or not to accept the location request. If the mobile station accepts the request, the mobile station acquires position information to send to the PDE 118 in one or more PDDMs.

From information received from the mobile station 102 in one or more PDDMs, the PDE 118 computes (at 326) the position of the mobile station 102, and sends the position information in a gposreq message (at 328) to the serving MPC 116. The serving MPC 116 then sends (at 330) the position data to the location service client (which in this case is the ES network 112).

By adding the EMERGENCY_SERVICES field to the GPM or UPM (or any other page from the base station to the mobile station), the mobile station that is configured to support ES-related location services but not VAS-related location services can detect that the page is ES-related. As result, the mobile station can allow an SO 35 or 36 connection for the exchange of PDDMs over a traffic channel.

Adding an EMERGENCY_SERVICES field to the header of a PDDM (sent by the PDE 118 to the mobile station 102) enables the mobile station to discern whether or not a received PDDM is ES-related. If the mobile station is currently in a VAS-related session, the mobile station can preempt the VAS-related session in favor of the ES-related session.

According to one example implementation, the packet data unit (PDU) format for a general page message (GPM) that is addressed for a mobile station includes the following:

| Field | Length |
| --- | --- |
| SERVICE_OPTION | 0 or 16 |
| EMERGENCY_SERVICES | 0 or 1 |

If a location-based service option is requested, then the base station sets the SERVICE_OPTION field to a corresponding value for the requested service option (e.g., SO 35 or SO 36 according to TIA/EIA/IS-801-1). The EMERGENCY_SERVICES field is omitted if the SERVICE_OPTION field is not set to SO 35 or 36. However, if the SERVICE_OPTION field is set to SO 35 or SO 36, then the EMERGENCY_SERVICES field is set to "1" to indicate that the GPM is related to an emergency call, or set to "0" if the GPM is not related to an emergency call.

The PDU format for the universal page message (UPM) that is addressed for a mobile station includes the following:

| Field | Length (Bits) |
| --- | --- |
| SERVICE_OPTION | 16 |
| ADD_MS_RECORD | 0 or 8 x EXT_MS_SDU_LENGTH |
| EMERGENCY_SERVICES | 0 or 1 |

The UPM also includes a SERVICE_OPTION field that can be set to indicate a desired service option. The optional ADD_MS_RECORD field refers to the additional mobile station addressed information record. The EMERGENCY_SERVICES field is omitted if the SERVICE_OPTION field does not specify SO 35 or 36. However, if SERVICE_OPTION field specifies either SO 35 or 36, the EMERGENCY_SERVICES field is set to "1" if the page is ES-related, or set to "0" if the page is not ES-related.

According to one implementation, forward link messages that can be sent from the PDE 118 to the mobile station 102 include PDDMs according to the following format:

| Field | Length (Bits) |
| --- | --- |
| SESS_START | 1 |
| SESS_END | 1 |
| . | |
| . | |
| . | |
| NUM_REQUESTS | 4 |
| NUM_RESPONSES | 4 |
| EMERGENCY_SERVICES | 1 |
| RESERVE | 7 |

Note that an EMERGENCY_SERVICES field is included in the PDDM. The PDE 118 sets the EMERGENCY_SERVICES field to "1" if the PDDM is related to emergency services; otherwise, the EMERGENCY_SERVICES field is set to "0."

Instructions of the various software routines or modules discussed herein (such as software executable in the mobile station 102, base station 104, MSC 110, MPC 116, and PDE 118) are loaded for execution on corresponding control units or processors, such as a processor 144 in the mobile station 102, a processor 136 in the BSC 108, a processor 134 in the MSC 110, and a processor 130 in the PDE 118. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in one or more machine-readable storage media, such as storage 146 in the mobile station 102, storage 138 in the BSC 108, storage 134 in the MSC 110, and storage 132 in the PDE 118. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

What is claimed is:

1. A method comprising:
communicating a first message to a mobile station to move to a traffic channel in response to a callback to the mobile station by at least one of an emergency services entity or a law enforcement entity;
communicating, to the mobile station and over the traffic channel, a second message containing:
an indicator having two or more available alternate states including a first state to indicate that the second message is related to at least one of an emergency-related location service or a law enforcement-related service, and a second state to indicate that the second message is related to a value-added service; and
an information element separate from the indicator and within the second message that indicates a location request for a location of the mobile station;
receiving an indication of an acceptance of the location request by the mobile station;
receiving information via the traffic channel regarding the location of the mobile station.

2. The method of claim 1, wherein the second message containing the indicator comprises one of a general page message (GPM) containing the indicator or a universal page message (UPM) containing the indicator.

3. The method of claim 1, wherein communicating the second message comprises sending the information element to identify service option 35 or service option 36, and a different information element that includes the indicator to indicate whether the page is related to the emergency-related location service or law enforcement-related location service.

4. The method of claim 3, further comprising a base station setting a state of the indicator to one of the two or more available alternate states based on a state of a field in a paging request from a mobile switching center indicating whether the paging request is related to the emergency-related location service or the law enforcement-related service.

5. The method of claim 1, wherein the second message comprises a position determination data message (PDDM) containing an indication of whether the PDDM is related to at least on of an emergency-related location service or a law enforcement-related location service.

6. The method of claim 5, wherein sending the PDDM message comprises sending an TIA/EIA/IS-801 PDDM message.

7. The method of claim 5, further comprising:
receiving a position request containing a field indicating whether the position request is related to at least one of the emergency-related location service and the law enforcement-related location service; and
setting a state of the indication in the PDDM based on a state of the field in the position request.

8. The method of claim 1, wherein said communicating comprises communicating the second message to a mobile station from a base station to initiate a call with the mobile station.

9. The method of claim 1, wherein said communicating is performed by a base station in response to receipt by the base station of a paging request from a system controller, wherein the paging request contains an indication of whether the paging request is related to at least one of the emergency-related location service or the law enforcement-related location service.

10. A method, comprising:
receiving at a mobile station a first message instructing the mobile station to move to a traffic channel in response to a callback from at least one of an emergency services entity or a law enforcement entity;
causing the mobile station to move to the traffic channel;
receiving a second message by the mobile station and over the traffic channel, the second message containing:
an indicator having two or more available alternate states including a first state to indicate that the second message is related to at least one of the emergency-related location service or the law enforcement-related location service, and a second state to indicate that the second message is related to a value-added service; and
an information element within the second message that indicates that the message is location-related;
examining the second message to determine whether to accept the message based on association of the second message with either an emergency-related location service or a law enforcement-related location service;
responding to the second message by sending a response over the traffic channel indicating acceptance of a location service-related option specified in the second message.

11. The method of claim 10, wherein said examining comprises:
ascertaining that the indicator is set to the first state.

12. The method of claim 10, further comprising:
the mobile station communicating position determination data messages (PDDMs) on the traffic channel with a position determination entity (PDE);
the mobile station determining whether one or more received PDDMs are related to the emergency-related location service or law enforcement-related location service; and
in response to determining that the one or more received PDDMs are related to the emergency-related location service or law enforcement-related location service, the mobile station accepting request elements in the one or more received PDDMs.

13. The method of claim 10, wherein receiving the second message comprises receiving a page from a base station to initiate a call with the mobile station, the page containing the indicator set to the first state to indicate that the page is related to at least one of the emergency-related location service or the law enforcement-related location service.

14. A mobile device comprising:
one or more processors;
at least one machine-readable storage memory storing instructions that are executable by the one or more processors to cause the mobile device to perform operations comprising:
receiving messaging to cause the mobile device to move to a traffic channel of a wireless communications network in response to a callback by at least one of an emergency services entity or a law enforcement entity:
receiving a location request on the traffic channel containing an indication that the location request is related to at least one of an emergency-related location service or a law enforcement-related location service;
sending location information of the mobile device in response to the location request;
receiving a page containing an indication that the page is associated with at least one of an emergency-related location service or a law enforcement-related location service; and
responding to the page by accepting a service option of the page based on the indication.

15. A system comprising:
an interface to communicate messages to a mobile station;
a controller having a processor; and
one or more computer-readable storage media storing instructions that are executable by the processor to cause the system to perform operations including:
communicating a first message to the mobile station to move to a traffic channel in response to a callback to the mobile station by at least one of an emergency services entity or a law enforcement entity;
configuring a second message, including setting a first indicator in the second message to a state of two or more available alternate states of the indicator, the two or more states including a first state that indicates that the second message is related to at least one of an emergency-related location service and or a law enforcement-related location service, and a second state that indicates that the second message is related to a value-added service;
including within the second message a second indicator indicating a location request for a location of the mobile station;
communicating the second message over the traffic channel to the mobile station;
receiving an indication of an acceptance of the location request by the mobile station; and
receiving location information from the mobile station over the traffic channel.

16. The system of claim 15, wherein the controller is configured to send one or more of the first message or the second message to the mobile station in response to an idle-mode query initiated by an emergency services entity to the mobile station.

17. The system of claim 15, comprising a base station including the interface and controller, wherein the second message comprises a page sent over a wireless link from the base station to the mobile station to initiate a call with the mobile station.

18. The system of claim 15, wherein the controller is configured to send data over a traffic channel, the data comprising a position determination data message (PDDM) containing an indication of whether the PDDM is related to emergency services.

19. A mobile station comprising:
one or more processors; and
one or more computer-readable storage media storing instructions that are executable by the one or more processors to perform operations including:
moving to a traffic channel in response to a callback to the mobile station by at least one of an emergency services entity or a law enforcement entity;
receiving a page over the traffic channel;
identifying within the page an information element that specifies that the page is related to a location request;
identifying within the page an indicator having two or more available alternate states including a first state to indicate that the page is related to at least one of an emergency-related location service or a law enforcement-related service, and a second state to indicate that the page is related to a value-added service; and communicating over the traffic channel an indication of an acceptance of the location request, and location information for a location of the mobile station.

20. The mobile station of claim 19, wherein the operations include accepting the received page in response to the indicator indicating that the page is related to the emergency-related location service or law enforcement-related location service.

21. The mobile station of claim 19, comprising one of a mobile phone, a portable computer with a wireless modem, a wireless-enabled personal digital assistant (PDA), and a global positioning system (GPS) device.

22. The mobile station of claim 19, wherein the page received by the mobile station is sent by a base station to initiate a call with the mobile station.

23. The mobile station of claim 19, wherein the information element is separate from the indicator.

\* \* \* \* \*